UNITED STATES PATENT OFFICE.

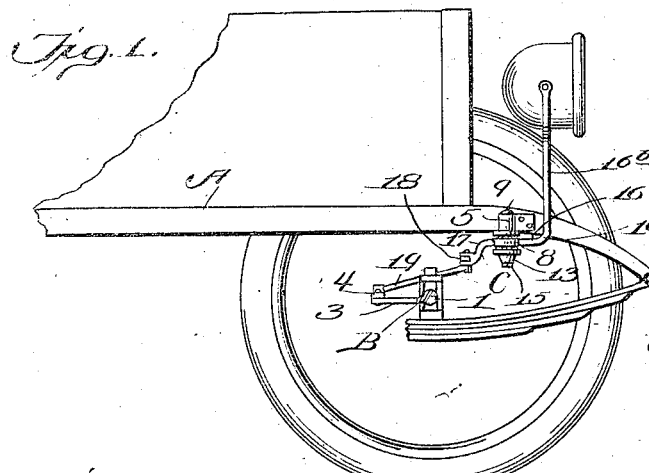
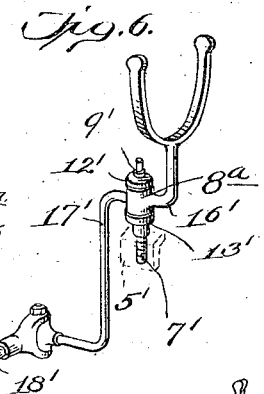
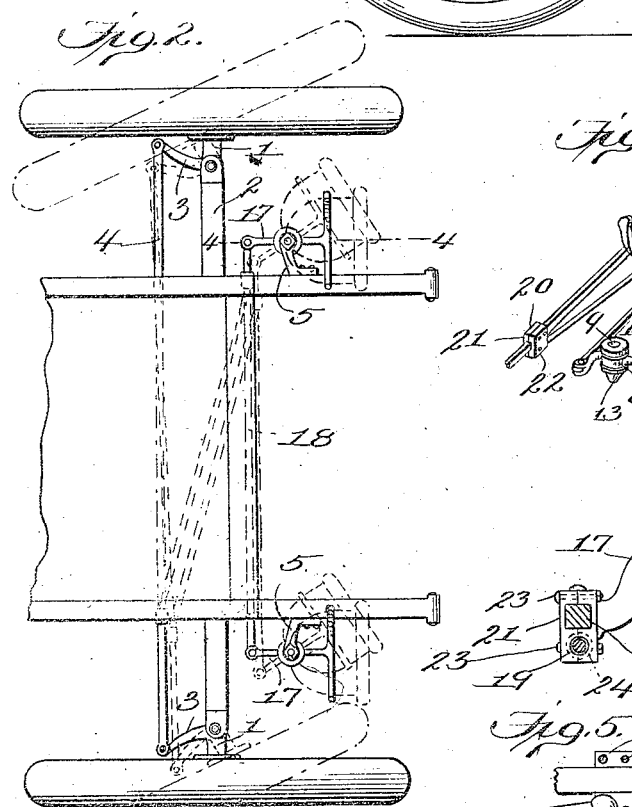
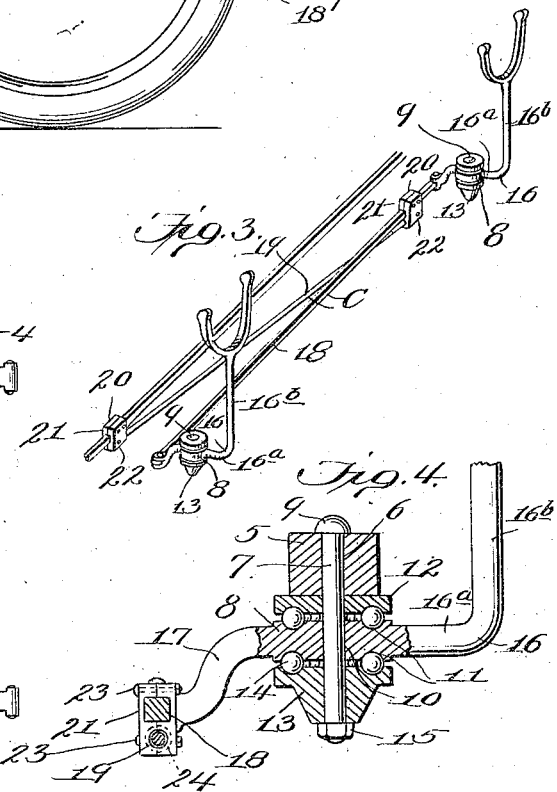
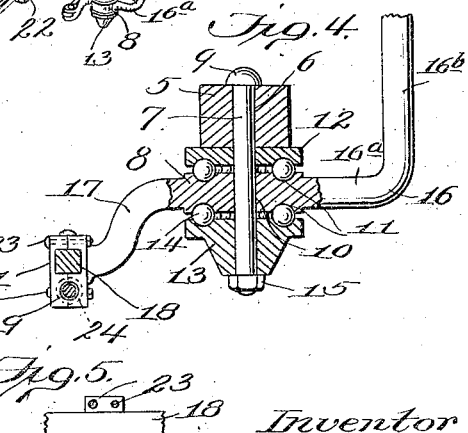

WILLIAM BURKE, OF HUNTINGTON, WEST VIRGINIA, ASSIGNOR, BY DIRECT AND MESNE ASSIGNMENTS, TO THE AUTOMOBILE ACCESSORY COMPANY, OF ASHLAND, KENTUCKY, A CORPORATION OF KENTUCKY.

AUTOMATIC DIRIGIBLE LAMP.

1,185,475.      Specification of Letters Patent.      Patented May 30, 1916.

Application filed September 14, 1915. Serial No. 50,687.

*To all whom it may concern:*

Be it known that I, WILLIAM BURKE, a citizen of the United States, residing at Huntington, in the county of Cabell and State of West Virginia, have invented new and useful Improvements in Automatic Dirigible Lamps, of which the following is a specification.

The present invention relates to automatic dirigible lamps for vehicles and particularly to that type of dirigible lamp which is operated by the steering gear of the vehicle.

It is an object of the invention to provide a novel means for actuating or oscillating the head lamps of a vehicle in unison with the operation of the steering gear, so that the head lamps will effectively illuminate the path of the vehicle.

The main object of the invention is to produce means of the above character that is simple in construction, consisting of few parts, and which may be applied with facility to machines of different makes and types.

With these ends in view, the invention consists in a certain novel construction, arrangement and combination of parts hereinafter more fully described and finally pointed out in the appended claims.

In the drawings which form part of the specification: Figure 1 is a fragmentary side elevation of an automobile with the present invention applied thereto, parts being broken away to illustrate the detail construction of the present invention; Fig. 2 is a plan view of the steering and running gear of a vehicle with the invention applied thereto, the operation of the same being illustrated in dotted lines; Fig. 3 is a perspective view of the invention when removed from the vehicle; Fig. 4 is a detail sectional view taken on the line 4—4 of Fig. 2; Fig. 5 is a detail view showing the means employed to connect the shifting rod to the rocker bar; and Fig. 6 is a detail perspective view of a slightly modified form of the invention.

Similar reference characters denote like parts throughout the specification and drawings.

Referring particularly to the drawings, A indicates the chassis of the vehicle and B indicates a portion of the steering gear of the vehicle to which the lamp mechanism C is connected. The steering gear, here shown, is of the usual and conventional type, comprising stub axles 1 pivoted to the front axle 2 of the vehicle and having arms 3 extending rearwardly therefrom. The arms 3 are connected together by the usual connecting rod 4 through which the stub axles are simultaneously operated from a suitable steering wheel, not shown, having connection with the rod 4.

Suitably secured to each side of the chassis of the vehicle, preferably in advance of the front or stationary axle 2, is a bracket arm 5 having a vertical aperture 6 in its free end. A bolt or pivot member 7 extends through the aperture 6 and has an enlarged head 9 to prevent the pivot from falling through said aperture. The lower end of the bolt or pivot 7 depends from the bracket arm 5.

The dirigible support of each lamp comprises a disk 8 having a central aperture 10, through which the depending end of the pivot 7 extends, the disk having annular grooves or ball races 11 on its opposite sides. Upper and lower bearing plates 12 and 13, respectively, are arranged on the pivot 7 and on opposite sides of each disk, and have ball races formed in their faces which lie adjacent to the disk 8, which ball races are complementary to the ball races of the disk 8 and receive anti-frictional members 14. The upper bearing plate 12 may be formed integral with the bracket arms 5, while the lower bearing plate 13 preferably has a conical projection on its lower face against which a nut 15 bears. The nut 15 is threaded on the lower end of the pivot 7 and is adapted to hold the bearing plates, disk and anti-frictional members in assembled and operative position.

Secured to the periphery of each of the disks 8 and projecting therefrom is a forwardly extending lamp bracket 16, which may be made integral with the disk 8 or be secured thereto by suitable fastening means. As here shown, the lamp bracket comprises a horizontal extension 16ª, having immediate connection with the disk and carrying the upright lamp supporting arm 16ᵇ. Extending from each of the disks 8, preferably at a point diametrically opposite the lamp bracket 16, is an arm 17, and said arms 17 of the disks 8 are pivotally connected by a rocker bar 18 extending parallel with the connecting rod 4. Extending diagonally between the connecting rod 4 and the rocker bar 18, and connecting the same, is a shifting rod 19 having its opposite ends connected, respectively, to the connecting rod 4 and rocker bar 18 by suitable clamping members 20 consisting of complemental sections 21 and 22 adapted to be secured together on opposite sides of said respective rod and bar by suitable fastening members 23, such as screws, or the like. The opposite ends of the shifting rod 19 are of a knobbed or spherical formation, as is shown at 24, Fig. 5. Each of the sections 21 and 22 of the clamping members is recessed to form a socket, when said sections are secured together in position, to receive and retain the knobbed ends 24 of the shifting rod 19.

In Fig. 6 a slightly modified embodiment of the invention is illustrated. In this embodiment the rotary disks or members 8ᵃ, together with the upper and lower bearing members 12′ and 13′, are supported upon a suitable portion 5′ of the vehicle by the lower end of the bolt or pivoted member 7′. This form of support has been devised for use upon motor vehicles of a type different from that illustrated in Fig. 1, but in said form of support the principle and spirit of the invention are not departed from. As also shown in Fig. 6, the arm 17′ may be elongated to meet the requirements of various automobiles, as will be readily understood.

From the foregoing, it will be seen that the invention embodies a simple mechanism for simultaneously operating the headlamps of a vehicle with the movement of the wheels, or steering gear thereof so as to always position the lamps to direct their light in front of and in the path of the vehicle. The invention as a whole consists of few parts which operate with great ease, which may be easily applied to various machines and which are durable in operation.

It is to be understood that the invention is not limited to the precise construction shown, but that such variations may be made in the construction and arrangement of parts as fall within the scope of the appended claims.

What is claimed is:—

1. A dirigible lamp for vehicles, comprising a rotatable disk having a lamp bracket and an arm projecting therefrom at diametrically opposite points, upper and lower bearing plates for said disk, anti-friction members arranged between said disk and said upper and lower bearing plates, and means for rocking said arm.

2. Automatic dirigible lamps for vehicles, comprising, in combination, stub axles having arms, a connecting rod between said arms, a plurality of disks rotatably mounted on the frame of the vehicle, a lamp bracket projecting from each of said disks, an arm extending from each of said disks, a rocking bar connecting the arms of the disks, a shifting rod connecting said connecting rod and rocking bar, upper and lower bearing plates for the disks, and anti-frictional members interposed between said disks and upper and lower bearing plates.

3. Automatic dirigible lamps for vehicles, comprising, in combination, stub axles having arms, a connecting rod between said arms, a plurality of disks rotatably mounted on the frame of the vehicle, lamp brackets carried by the disks, a rocking bar connecting the disks, complemental clamping members carried by the connecting rod and by the rocking bar, said members being recessed to form a socket when clamped together, and a shifting rod provided with knobbed ends and having its opposite ends arranged in the sockets of the clamping members on the connecting rod and rocking bar, respectively.

4. A dirigible lamp for vehicles, comprising a pivot for attachment to the frame of the vehicle, a disk rotatably mounted on the pivot, a lamp bracket projecting from said disk, an arm projecting from said disk, upper and lower bearing plates for said disk, anti-frictional members interposed between said disk and upper and lower bearing plates, means on the pivot for holding said bearing plates and disk in position, and a shifting rod connected to said arm.

5. Automatic dirigible lamps for vehicles, comprising, in combination, stub axles, a rod connecting said axles, a disk rotatably mounted on the frame of the vehicle, a lamp bracket projecting from the disk, a shifting rod connected to said connecting rod and having a connection with the disk, upper and lower bearing plates for the disk, and anti-frictional members interposed between said disk and upper and lower bearing plates.

6. Automatic dirigible lamps for vehicles, comprising, in combination, steering mechanism for the vehicle, a pivot member extending from the frame of the vehicle, a disk rotatably mounted on said pivot, a lamp bracket extending from said disk, an arm extending from said disk, upper and lower bearing plates carried by said pivot and on opposite sides of the disk, said bearing plates having ball races formed therein, said disk having corresponding ball races formed in its opposite sides, anti-frictional members in said races, and means connecting said arm with the steering gear of the vehicle.

7. Automatic dirigible lamps for vehicles, comprising, in combination, steering mechanism for the vehicle, a pivoted member extending from the frame of the vehicle, a disk rotatably mounted on said pivot, bearing plates arranged on opposite sides of the disk and having ball races formed therein, said disk having corresponding ball races formed therein, anti-frictional members in said races, means on said pivot for removably holding said bearing plates and disk in position, a lamp bracket extending from said disk, an arm extending from the disk, and means connecting said arm with the steering gear of the vehicle.

In testimony whereof I have hereunto set my hand in presence of two subscribing witnesses.

WILLIAM BURKE.

Witnesses:
JOHN C. LAFFIN,
F. L. DOOLITTLE.